G. O. BURLEW.
DENTAL TOOL FOR CLEANING TEETH.
APPLICATION FILED MAY 22, 1914.

1,238,883.

Patented Sept. 4, 1917.

WITNESSES
Geo. G. Senior
Clifford A. Alliston.

INVENTOR
Gilderoy O. Burlew
BY
Fred C. Fischer.
ATTORNEY

UNITED STATES PATENT OFFICE.

GILDEROY O. BURLEW, OF NEWARK, NEW JERSEY.

DENTAL TOOL FOR CLEANING TEETH.

1,238,883.   Specification of Letters Patent.   Patented Sept. 4, 1917.

Application filed May 22, 1914. Serial No. 840,141.

*To all whom it may concern:*

Be it known that I, GILDEROY O. BURLEW, a citizen of the United States, residing in the city of Newark, in the county of Essex and State of New Jersey, have invented certain new and useful Improvements in Dental Tools for Cleaning Teeth, of which the following is a full, clear, and exact description, such as will enable others skilled in the art to which it pertains to make and use the same, reference being had to the accompanying drawings, and to numerals of reference marked thereon, forming a part of this specification.

My invention relates to improvements in dental tools for cleaning teeth. More particularly my invention lies in the construction and composition of that portion of the tool which comes in direct contact with the teeth, and the tool itself can be of many different shapes and can be operated either by power or manually. My invention is especially intended to produce a cleaning tool for teeth which has not merely a flexible but a yielding surface, comprising in the main soft rubber, vulcanized, but not vulcanized hard enough to make it rigid, and in the body of this material is incorporated any suitable gritty or polishing substance. The body of the tool is preferably vulcanized so as to be of the same degree of hardness throughout, and by having it yielding and soft, to attain several objects. First, the yielding surface conforms to all the irregularities of the teeth, and it has a drawing or wiping effect as it is moved over the teeth thereby cleaning them without injuring the enamel, or without the disagreeable and unsafe cutting effect of many polishing tools. Furthermore, in constructing a tool of this material, the tool does not glaze or become hard, but it furs or tears so that after being used a while it has a somewhat ragged appearance, but this only increases its cleaning effect, and also gives it a better polishing effect on the teeth. Too much abrasive material is bad for the enamel of the teeth, but with my tool, being of a soft even structure throughout, and by reason of its softness tending to fur and tear, very little abrasive is needed because the soft swab-like effect of the tool causes it to fit the surface of the tooth and polish it nicely.

I am aware that soft rubber disks and similar things have been used, but these are generally dipped into receptacles containing pumice powder, and the like, and such tools quickly glaze, and they also throw the powder around disagreeably in the mouth or over the person of a patient.

Reference is to be had to the accompanying drawings forming a part of this specification in which similar reference characters indicate corresponding parts in all the views.

The disk 1 is not unlike many polishing disks in shape, being thickest in the center and tapering toward the edges, and it has a central hole to receive the ordinary mandrel or carrying shaft, but the form of the tool is not material, and it can be made in any of the approved or preferred forms.

Figure 1:
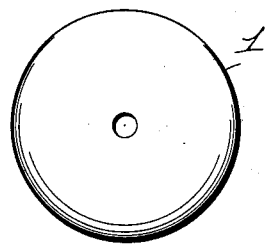
Figure 1 is a plan view of a tool in disk form showing one embodiment of my invention.
Figure 2:
Fig. 2 is a cross section of the structure shown in Fig. 1.
Figure 3:
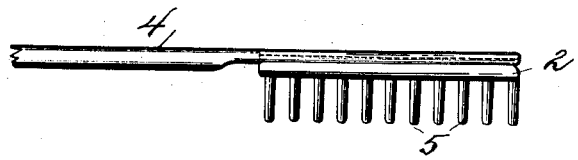
Fig. 3 is a side elevation of a toothbrush having the tooth engaging parts made in accordance with my invention.
Figure 4:
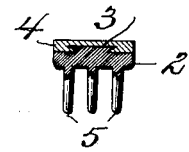
Fig. 4 is a cross section through the head of the brush.

In Figs. 3 and 4 I have shown a toothbrush made in accordance with my invention, in which the head 2 of the brush has a dovetailed rabbet 3 on the back fitting into a corresponding recess in the end of the handle 4, while the teeth 5 are made to engage and enter between the teeth. The teeth 5 are made in accordance with my invention of soft vulcanized rubber with the polishing and cleaning substance incorporated therewith. The two examples shown in the drawing illustrate the use of the invention, but as above stated the cleaning tool can be made in any preferred form. The essential thing is that the tooth engaging part of the tool be made of soft vulcanized rubber having a yielding surface, and that the polishing or cleaning material be thoroughly incorporated with the rubber composition. When thus made the tool, without regard to its type or style, has a surface which adapts itself to the form of the tooth to which it is applied, it has a drawing or wiping effect necessary to get the best cleaning result, and it contains its own polishing or cleaning medium so that the use of powders or the like is obviated.

I claim:—

1. As an improved article of manufacture a dental tool for cleaning teeth, said tool being formed of soft vulcanized rubber which furs or tears in use, and with a polishing material incorporated in the body of the structure.

2. As an improved article of manufacture a dental tool for cleaning teeth, said tool being formed of soft vulcanized rubber of an even degree of hardness throughout, with a polishing material incorporated in the body and with the body of such substance as to tear and fur under use.

This specification signed and witnessed this 20th day of May, 1914.

GILDEROY O. BURLEW.

Witnesses:
 FRED'K C. FISCHER,
 CLIFFORD A. ALLISTON.